United States Patent [19]
Van Rijn

[11] Patent Number: 5,660,142
[45] Date of Patent: Aug. 26, 1997

[54] WATER QUALITY CONTROL IN FISH PONDS

[75] Inventor: Jaap Van Rijn, Rehovot, Israel

[73] Assignee: Yissum Research Development Company of the Hebrew University of Jerusalem, Jerusalem, Israel

[21] Appl. No.: 436,204

[22] PCT Filed: Nov. 18, 1993

[86] PCT No.: PCT/EP93/03226

§ 371 Date: Jul. 7, 1995

§ 102(e) Date: Jul. 7, 1995

[87] PCT Pub. No.: WO94/10833

PCT Pub. Date: May 26, 1994

[30] Foreign Application Priority Data

Nov. 18, 1992 [IL] Israel ............................ 103809

[51] Int. Cl.⁶ .................... F22B 23/00; F22B 25/00
[52] U.S. Cl. .................... 119/227; 119/226; 119/228; 119/231; 119/225
[58] Field of Search .................... 119/226, 227, 119/228, 231, 225; 210/605, 143, 150, 169, 209

[56] References Cited

U.S. PATENT DOCUMENTS

| | | | |
|---|---|---|---|
| 3,116,712 | 1/1964 | Ogden et al. | 119/226 |
| 3,166,043 | 1/1965 | Castillo | 119/226 |
| 3,661,119 | 5/1972 | Sanders | 119/226 |
| 5,176,100 | 1/1993 | Fujino | 119/227 |
| 5,482,630 | 1/1996 | Lee et al. | 210/605 |

OTHER PUBLICATIONS

Aquacultura Engineering 9:217–234 (1990), Rijn & Rivera, pp. 217–234. Aug. 1, 1990.

*Primary Examiner*—Gene Mancene
*Assistant Examiner*—Pedro Philogene
*Attorney, Agent, or Firm*—Keck, Mahin & Cate

[57] ABSTRACT

There is provided a system for water quality control and improvement in intensive fish culture systems. The aim of the water treatment is to reduce the content of inorganic nitrogen and of organic matter. The system comprises a fish pond, a settling pond, a fluidized bed reactor and a trickling filter. The system according to the invention can be an essentially closed one, except for periodic water replenishment. It is suited for ponds with sweet or salt water.

8 Claims, 2 Drawing Sheets

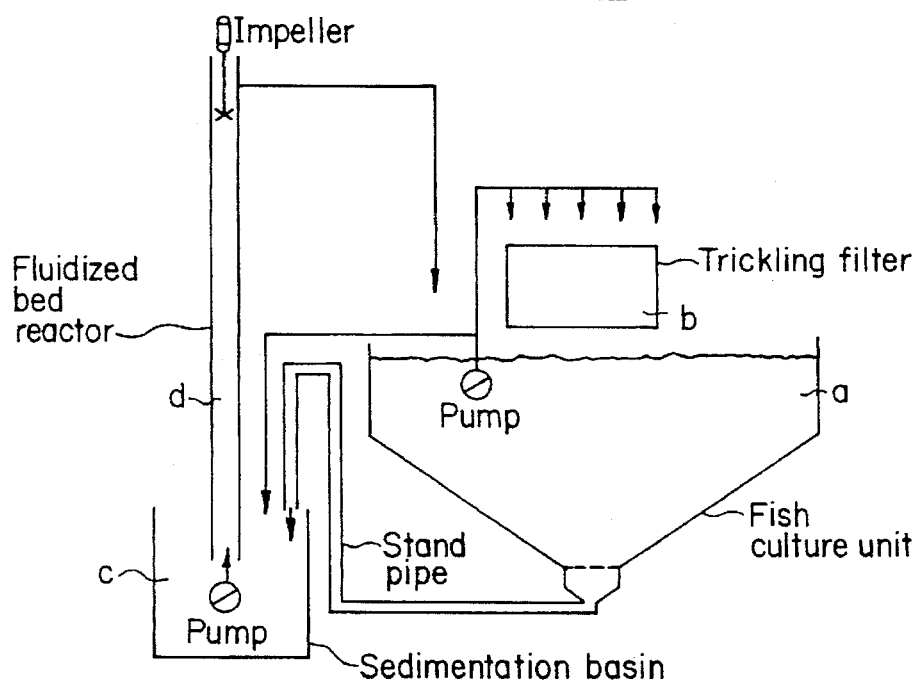
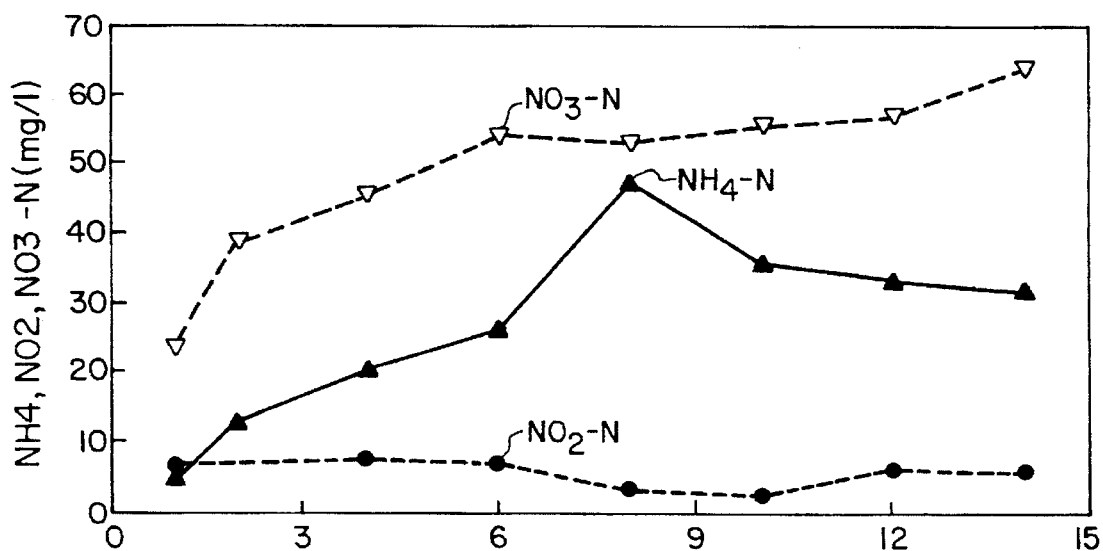

1

WATER QUALITY CONTROL IN FISH PONDS

The system of the invention is suited for water quality control in intensive fish culture systems. The treatment system is capable of reducing inorganic nitrogen and organic matter in closed aquaculture facilities (without water exchange) to levels not harmful to fish. The treatment system is compact and is especially suitable for fish culture in heated, indoor aquaculture facilities.

BACKGROUND OF THE INVENTION

In recent years, aquaculture (cultivation of fish or other aquatic organisms) is characterized by a tendency towards growing more fish per unit area. Special ponds have been constructed (Zohar and Rappaport, Zohar, G., Rappaport, U. and S. Sarig, 1985. Intensive culture of tilapia in concrete tanks. *Bamidgeh* 37: 103–112, 1985; van Rijn et al., van Rijn, J., Stutz, S. Diab, S. and M. Shilo. 1986. Chemical, physical and biological parameters of superintensive concrete fish ponds. *Bamidgeh* 38: 35–43. van Rijn, J. and G. Rivera. 1990. Aerobic and anaerobic biofiltration in an aquaculture unit—Nitrite accumulation as a result of nitrification and denitrification. *Aquacult. Engineer.* 9: 217–234. 1986) that enable stocking densities of up to 50 times the stocking densities generally maintained in conventional fishponds. As opposed to conventional fishponds, waterquality deterioration proceeds rapidly in these intensive fishponds and without man-made interference, fish mortality would be imminent. DE-A-38 27 716 describes a system for water quality control in intensive fish culture systems for reducing inorganic nitrogen and organic matter concentrations in an open system. Theoretically, two options exist as to maintaining an adequate waterquality in these intensive fish culture ponds. Either the ponds are continuously flushed with clean (unpolluted) water or the pondwater is continuously treated in order to reduce the level of pollutants. Unlimited amounts of clean water to flush the ponds is a luxury which is restricted to a few geographical areas only. Therefore, treatment of the pondwater is the option of choice in most places.

The accumulation of inorganic nitrogen in intensively cultured fishponds is one of the major limiting factors preventing a further intensification. Inorganic nitrogen (especially ammonia and nitrite) is toxic to fish and it accumulates in the pondwater through excretion of ammonia by the fish and by breakdown of organic solids. Most of the treatment systems used in aquaculture facilities are designed to facilitate the growth of nitrifying bacteria which oxidize ammonia via nitrite to nitrate. A drawback of the ammonia removal by means of nitrification is the subsequent increase in nitrate in the culture system. Nitrate concentrations of up to 800 mg liter$^{-1}$ NO$_3$—N have been recorded in semi-closed aquaculture facilities where nitrification was employed as water purification step. High nitrate concentrations ought to be prevented for several reasons. Firstly, nitrate at high concentrations has a toxic effect on several fish species. Secondly, the discharge of nitrate-rich effluent water is prohibited in many countries due to environmental and public health considerations. The maximum levels of nitrate allowed in the effluent water differ from country to country and are as low as 11.6 mg liter$^{-1}$ NO$_3$—N in Europe according to the European Community directive. Thirdly, under certain conditions nitrate in the fish culture system is converted to nitrite, a compound extremely toxic to fish.

A treatment system was developed by our group (van Rijn and Rivera, 1990) which was aimed a reducing inorganic nitrogen from the pond water by means of induction of two microbial process: nitrification (oxidation of ammonia to nitrate) and denitrification (reduction of nitrate to N$_2$ gas). Nitrification was induced in a socalled trickling filter containing material previously not used for this purpose. Denitrification was induced in fluidized bed reactors. As denitrification is a heterotrophic process (denitrifying bacteria require organic matter for growth and metabolism), organic matter derived from the fishpond was led through the fluidized bed reactor. This treatment system was not entirely satisfactory as denitrifying activity in the fluidized bed reactors was highly unpredictable and large daily fluctuations in nitrate removal were observed. Furthermore, nitrite accumulation by the fluidized bed reactor was found under all running conditions tested (van Rijn and Rivera, 1990).

SUMMARY OF THE INVENTION

According to the invention the treatment system has been modified by incorporating a settling stage in which organic matter derived from the fishpond is partially degraded. The supernatant of the settling pond, rich in organic decomposition products, is then used to "fuel" denitrifying activity in the fluidized bed reactor.

This modified treatment system has been demonstrated to be effective both at lab-scale and under experimental field conditions. In one of the stations for fishculture research we managed to maintain fish at a density of 20 kg m$^{-3}$ in a 50 m$^3$ pond over a three months period (July–September). The system was operated in a virtually, closed fashion (only 3 m$^3$ of water was daily added to the pond in order to compensate for evaporation losses). Both inorganic nitrogen and organic matter were reduced to levels securing optimal fish growth over the experimental period.

Thus the present invention relates to a closed system for water quality control in intensive fish culture systems, for preventing accumulation of inorganic nitrogen and organic matter, comprising in combination a fish pond, means for passing water to be treated from said pond to a settling pond where organic matter is reduced to CO$_2$ and mainly short-chain volatile fatty acids, a fluidized bed reactor into which water from settling pond is pumped and where nitrate is reduced to gaseous N$_2$ and short chain volatile fatty acids are oxidized to CO$_2$ by a plurality of anaerobic bacteria (anaerobic stage), while water from the pond is pumped through a trickling filter (aerobic stage) where ammonia is oxidized by nitrifying bacteria to nitrate, and returned to the pond.

The invention is illustrated by way of example only with reference to the enclosed schematical FIG. 1, which is a scheme of a fish pond and water treatment system of the invention.

As shown in FIG. 1 the fish pond "a" is connected with trickling filter "b", and with settling tank "c", from which water is pumped to the lower part of fluidized bed column "d", and after passage through "d" it is returned to pond "a".

The trickling filter "b" is provided with a large internal surface area, and means are provided in introduce water at its top, preferably by spraying. This water trickles down the filter via a plurality of channels. Water is pumped, preferably from the center of pond "a" to the setting tank (pond) "c", and supernatant water from this pond is pumped into the bottom of the fluidized bed column "d", and the water having passed this column is fed back to the fishpond "a". The settling tank serves to concentrate the organic material from the fish pond, and decomposition of this material takes place in this settling tank, resulting amongst others in the formation of acetate. The supernatant from this tank is fed to the fluidized bed reactor (column), where the acetate is used as carbon source by bacteria which reduce nitrate to gaseous nitrogen. While retention time in the settling tank is of the order of hours, it is of the order of minutes in the fluidized bed reactor. Generally a settling tank of from about 3 to 10 $m_3$ is adequate for use with a fish pond of about 50 $m_3$, by the way of example, which is illustrative only, a satisfactory experimental system is described in the following.

BRIEF DESCRIPTION OF THE DRAWINGS

The invention is illustrated with reference to the enclosed schematical Figures, in which:

FIG. 1 is a scheme of a fish pond and treatment system;

FIG. 3 illustrates the same in a control pond.

DESCRIPTION OF THE PREFERRED EMBODIMENTS

Figure 2A:
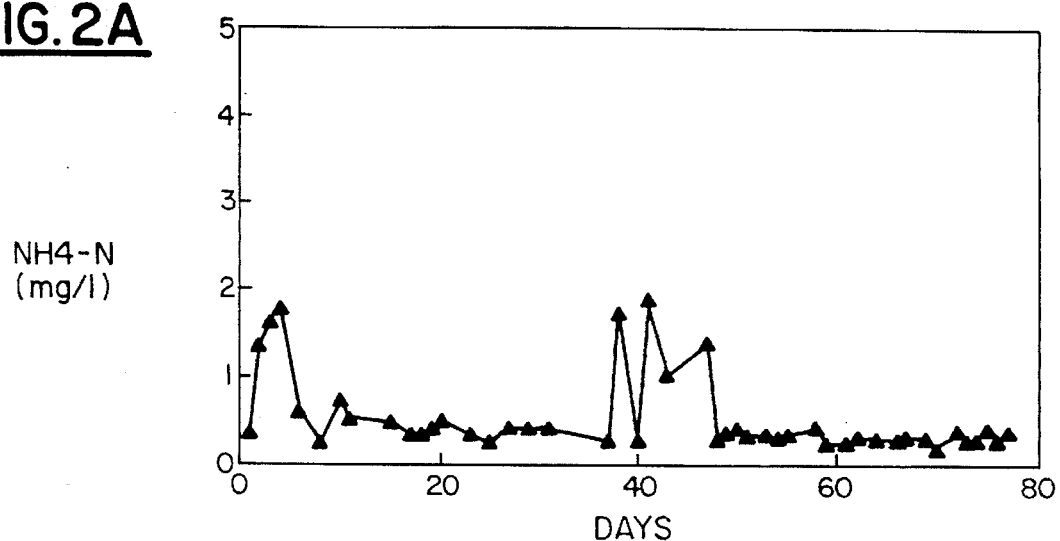
FIG. 2 illustrates ammonia (A), nitrite (B) and nitrate (C) concentrations in a system of the invention.

The following parameters are intended to give a rough indication of the order of magnitude of the operation of a system of the invention:

Generally the volume of the settling tank is of the order of from about 3 percent to about 10 percent of that of the volume of the fish pond.

Generally there is passed water from the pond through the trickling filter at a rate of the order of from about 20 to about 40 percent of the volume of the pond per hour. For a pond of about 50 $m^3$, a filter, a trickling filter of 2 m×2 m ×1.5 n as any corresponding configuration, with about 150to about 300 m internal surface area gave good results. For the same pond, a fluidized bed column of from about 3 to 6 meter height and 15 to about 25 cm internal diameter can be used, with a retention time of from about 5 to about 15 minutes.

These are data intended only to indicate an order of magnitude, and it is clear that these will vary from pond to pond according to its specific conditions, concentration of ammonia etc.

A scheme of the fishpond and treatment system is shown in FIG. 1. The trickling filter (b) with dimensions of 2.0× 2.0×1.5 m was constructed of PVC material (Jerushalmi Ltd, Nes Ziona, Israel) in such a configuration that water sprayed on top of the filter material trickles down the filter through a large number of smooth channels. The surface area provided by this PVC material is 200 $m^2$ $m^{-3}$. Water is pumped from the surface of the fishpond (a) onto the trickling filter at a flow rate of 15 $m^3$ $h^{-1}$. From the center of the fish pond water, rich in particulate organic matter (see van Rijn and Rivera, 1990), water is pumped to a settling tank (c) with a total volume of 3 $m^3$. Supernatant water from the settling tank is pumped into the bottom of a fluidized bed column (d) at a flow rate of 0.6–1.2 $m^{3\,-1}$. The fluidized bed column has a height of 4.8 m and an inner diameter of 19.3 cm (net volume: 131.5 liters). Retention time of the column varied, therefore, from 6.5–13 min. The fluidized bed column was filled with sand (diameter: 0.3–0.9 mm) up to 40–50 cm of column height. Water leaving the column through a side-arm at the top is led back into the fishpond. The water flow rate from the fishpond (50 $m^3$) to the setting tank is identical to the flow rate from the settling tank to the fluidized bed column. Therefore, the retention time of the settling tank varied from 2.5 to 5 hrs.

Performance

The treatment system was tested during the summer of 1992 at an experimental station in Israel. Common carp (*Cyprinus carpio*) were cultured in the fishpond (50 $m^3$) at a density of 20±4 kg $m^{-3}$ over a period of three months. During this period the treatment system was operated with a flow rate of 15 $m^3$ $h^{-1}$ through the trickling filter and a flow rate of 0.6 $m^3$ $h^{-1}$ through the settling tank and fluidized bed reactor. Clean water was supplied to the fish pond at a rate of 3 $m^3$ $day^{-1}$ in order to compensate for evaporation losses.

Inorganic nitrogen removal

Figure 2B:
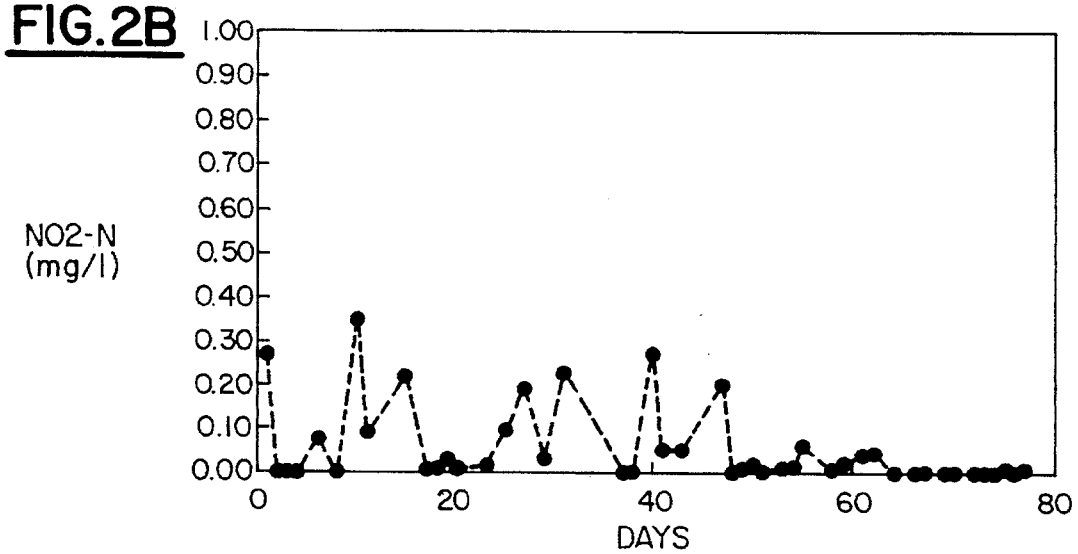
Figure 2C:
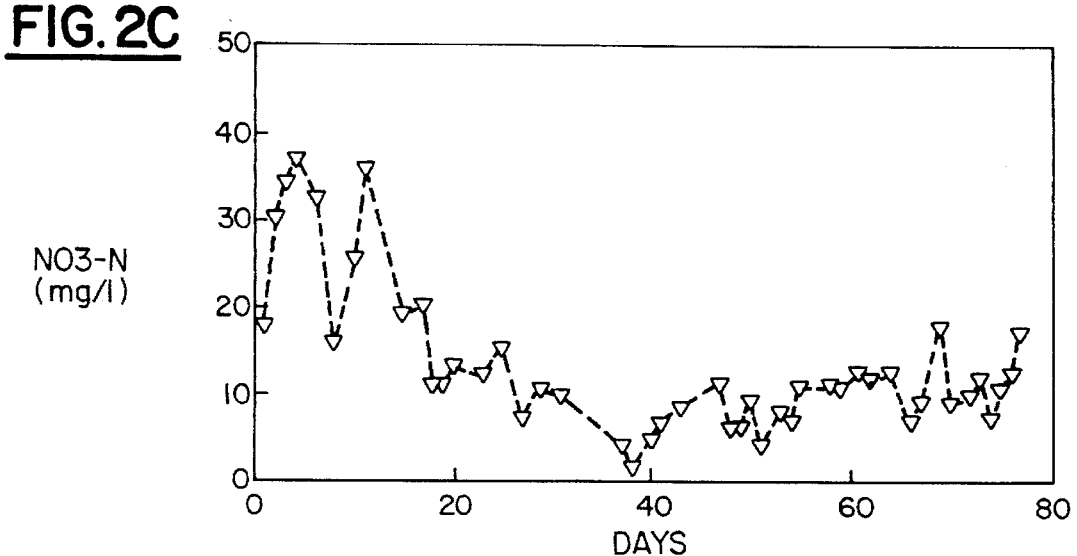

Concentrations of inorganic nitrogen in the treatment pond over this period were relatively low, well beneath he limits considered toxic to fish (FIG. 2). The elevated ammonia levels around day 40 were due to a repair of the trickling filter. It should be noted that ammonia concentrations above 1–2 mg $liter^{-1}$ $NH_4$–N and nitrite concentrations above 0.5–1.0 mg $liter^{-1}$ $NO_2$–N are considered to be harmful for fish growth. A similar operated control pond, lacking a treatment system, was operated for a period of 15 days. During this period concentrations of ammonia and nitrite reached toxic levels (FIG. 3), causing fish mortality from day 10 onwards. From additional control runs (not shown) with different daily quantities of clean water supply, it could be concluded that at least 250 $m^3$ of clean water was needed daily (five pond volume changes) in order to reach the low concentrations of inorganic nitrogen found in the treatment pond.

Organic matter removal

During the experimental period the net removal of organic matter by breakdown of organic matter in the settling tank and in the fluidized bed reactor was estimated to be 20–30% of total amount of organic matter entering the fishpond daily. It was found, furthermore, that short-chain fatty acids, in particular acetate, which were released through decomposition processes in the settling tank, were used as an energy and carbon source for the denitrifying bacteria in the fluidized bed column. It should be noted that the primary goal was aimed at designing a treatment system capable of reducing the levels of inorganic nitrogen in the fishpond. From preliminary studies it can be concluded that higher removal rates of organic matter can be obtained upon changing the retention time in the different components of the treatment system.

I claim:

1. A closed system for water quality control in intensive fish culture systems, for preventing accumulation of inorganic nitrogen and organic matter, comprising in combination a fish pond of sweet of salt water, means for passing water to be treated from said fish pond to a settling tank where organic matter is reduced to $CO_2$ and mainly short-chain volatile fatty acids, a fluidized bed reactor into which water from said settling tank is pumped and where nitrate is reduced to gaseous $N_2$ and the short chain volatile fatty acids are oxidized to $CO_2$ by a plurality of anaerobic bacteria in an anaerobic stage, while water from the fish pond is pumped through a trickling filter in an aerobic stage where ammonia is oxidized by nitrifying bacteria to nitrate, and returned to the fish pond.

2. A system according to claim 1, here water is added periodically to the pond to compensate for evaporated water.

3. A system according to claim 1 or 2, where the volume of the settling tank is from about 3 percent to about 10 percent the volume of the fish pond, and where the retention time is of the order of a few hours.

4. A system according to any of claims 1 to 3, where the trickling filter is provided with a large internal surface area which supports nitrifying bacteria, and through which water is passed from about 20 to 40 percent of the volume of the pond per hour.

5. A system according to claim 4, where for a pond of 50 $m^3$ the trickling filter has an internal surface of from about 200 $m^2$ to about 500 $m^2$.

6. A system according to any of claims 1 to 5, where means are provided for introducing the water from the settling tank at a rate of from about 0.5 to about 2 $m^3$ per hour for a 50 $m^3$ fish pond, with a retention time of the order of from about 5 to about 15 minutes in said fluidized bed.

7. A system according to any of claims 1 to 6, where the lower part of the fluidized bed is filled with an inert particulate material.

8. A system according to claims 1 to 7, where the supernatant from the settling tank, rich in organic material, and especially in short-chain fatty acids is fed to the fluidized bed reactor, where it serves as carbon source for the denitrifying bacteria.

* * * * *